(12) United States Patent
Lee et al.

(10) Patent No.: US 11,708,784 B2
(45) Date of Patent: Jul. 25, 2023

(54) ENGINE SYSTEM

(71) Applicant: LG ELECTRONICS INC., Seoul (KR)

(72) Inventors: Jinwoo Lee, Seoul (KR); Hojong Jeong, Seoul (KR); Heejoong Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/536,369

(22) Filed: Nov. 29, 2021

(65) Prior Publication Data

US 2022/0170409 A1    Jun. 2, 2022

(30) Foreign Application Priority Data

Dec. 1, 2020  (KR) .......................... 10-2020-0165270

(51) Int. Cl.
| | |
|---|---|
| *F01P 7/16* | (2006.01) |
| *F01P 5/10* | (2006.01) |
| *F02B 29/04* | (2006.01) |
| *F02B 37/12* | (2006.01) |
| *F25B 43/00* | (2006.01) |
| *F02B 31/04* | (2006.01) |

(Continued)

(52) U.S. Cl.
CPC ................ *F01P 7/165* (2013.01); *F01P 5/10* (2013.01); *F02B 29/04* (2013.01); *F02B 31/04* (2013.01); *F02B 37/12* (2013.01); *F02M 21/047* (2013.01); *F02M 26/19* (2016.02); *F25B 43/006* (2013.01); *F01N 2240/02* (2013.01)

(58) Field of Classification Search
CPC ..... F01N 2240/02; F01P 2060/16; F01P 3/12; F01P 3/20; F01P 5/10; F01P 7/165; F02B 29/04; F02B 31/04; F02B 37/12; F25B 43/006; Y02T 10/12; F02M 21/047; F02M 26/19

See application file for complete search history.

(56) References Cited

U.S. PATENT DOCUMENTS 3,935,847 A * 2/1976 Gamell .................. F02M 17/06
                                                         123/445
4,152,121 A * 5/1979 Van Der Weide ... F02M 21/047
                                                         123/527

(Continued)

FOREIGN PATENT DOCUMENTS

KR    10-2020-0062873    6/2020

*Primary Examiner* — Jesse S Bogue
(74) *Attorney, Agent, or Firm* — Ked & Associates (57) ABSTRACT

An engine system of the present disclosure includes an engine configured to drive a plurality of pistons by burning a mixture of air and gas, an air supply pipe through which the air supplied to the engine flows, a supercharger configured to compress the air flowing through the air supply pipe, a gas supply pipe through which the gas supplied to the engine flows, and a mixer configured to mix the air that has passed through the supercharger and the gas. The mixer has a venturi tube shape in which a cross-sectional area of a flow path decreases and expands in a flow direction of the air that has passed through the supercharger, and the gas supply pipe is connected to a portion of the mixer where the cross-sectional area of the flow path in the mixer is decreased.

17 Claims, 12 Drawing Sheets

(51) Int. Cl.
*F02M 26/19* (2016.01)
*F02M 21/04* (2006.01)

(56) References Cited

U.S. PATENT DOCUMENTS

| | | | | |
|---|---|---|---|---|
| 4,828,768 | A * | 5/1989 | Talmor | B01D 53/52 |
| | | | | 261/118 |
| 5,333,456 | A * | 8/1994 | Bollinger | F02M 26/05 |
| | | | | 60/605.2 |
| 5,611,204 | A * | 3/1997 | Radovanovic | F02M 26/25 |
| | | | | 417/151 |
| 5,797,379 | A * | 8/1998 | Sharples | F02M 21/047 |
| | | | | 48/144 |
| 6,003,316 | A * | 12/1999 | Baert | F02M 26/19 |
| | | | | 60/605.2 |
| 8,939,129 | B2 * | 1/2015 | Prinz | F02M 21/047 |
| | | | | 123/518 |
| 9,051,902 | B2 * | 6/2015 | Jones | F02M 26/19 |
| 9,863,371 | B2 * | 1/2018 | El Gammal | F02M 21/04 |
| 2003/0015596 | A1 * | 1/2003 | Evans | F02M 26/36 |
| | | | | 239/468 |
| 2003/0111063 | A1 * | 6/2003 | Iida | F02M 13/08 |
| | | | | 123/527 |
| 2006/0060172 | A1 * | 3/2006 | Liu | F02M 35/10118 |
| | | | | 123/568.17 |
| 2007/0074452 | A1 * | 4/2007 | Yates | F02M 21/047 |
| | | | | 261/DIG. 12 |
| 2009/0248271 | A1 * | 10/2009 | Kuzuyama | F02D 41/006 |
| | | | | 123/568.14 |
| 2018/0347509 | A1 * | 12/2018 | Wouters | B01F 25/31242 |

* cited by examiner

ENGINE SYSTEM

CROSS-REFERENCE TO RELATED PATENT APPLICATIONS

This application claims priority to Korean Patent Application No. 10-2020-0165270, filed Dec. 1, 2020, whose entire disclosures are hereby incorporated by reference.

BACKGROUND OF THE DISCLOSURE

Field of the Disclosure

The present disclosure relates to an engine system, and more particularly, to an engine system for driving an engine by mixing gas and air.

Related Art

An engine system used for a gas engine heat pump, etc. may drive an engine by burning a gaseous mixture in which gas and air are mixed. The gaseous mixture can be compressed and sent to the engine to increase the efficiency of the engine. This is to increase the efficiency of combustion by compressing air of a high specific gravity in the gaseous mixture, but it is difficult to create the gaseous mixture because a low pressure gas cannot be introduced into the compressed high pressure air.

Therefore, it is a general structure that in a state in which air and gas are mixed, the gaseous mixture is compressed and supplied to the engine.

Korean Patent Application Publication No. 10-2020-0062873 discloses that a mixture of air and gas supplied to an engine is compressed and supplied to the engine. In the case of compressing the mixture of air and gas, since the air is compressed together with the gas, a risk may be greatly increased compared to the case of compressing only air. That is, when an abnormal phenomenon occurs in a compression motor for compressing the gaseous mixture, the high-pressure gas included in the gaseous mixture may easily react thereto.

However, in order to prevent such a problem, when only air is first compressed, a low-pressure gas cannot be introduced into the high-pressure air and thus cannot be mixed.

SUMMARY

The present disclosure provides an engine system that compresses, among air and gas to be supplied to an engine, the air only and then mixes the gas with the compressed air to supply a gaseous mixture to the engine in a safe state.

Further, the present disclosure provides an engine system in which a flow path through which air flows to allow high-pressure compressed air to be mixed with relatively low-pressure gas is improved so that the relatively low-pressure gas can be introduced in a space in which the air flows.

In addition, the present disclosure provides an engine system capable of forming a rotational flow in a mixing region so that introduced gas can be properly mixed with air.

The problems of the present disclosure are not limited to the problems mentioned above, and other problems not mentioned will be clearly understood by those skilled in the art from the following description.

In an aspect, an engine system according to one embodiment of the present disclosure includes: an engine configured to drive a plurality of pistons by burning a mixture of air and gas; an air supply pipe through which the air supplied to the engine flows; a gas supply pipe through which the gas supplied to the engine flows; and a mixer configured to mix the air and the gas. The engine system of the present disclosure includes a supercharger configured to compress the air flowing through the air supply pipe, and the mixer mixes the air that has passed through the supercharger and the gas. In this case, since the gas cannot be mixed with the compressed air in a high pressure state, the mixer has a venturi tube shape in which a cross-sectional area of the flow path decreases and expands in a flow direction of the air that has passed through the supercharger, and the gas supply pipe is connected to a portion of the mixer where the flow path cross-sectional area of the mixer, so that the high-pressure air and the relatively low-pressure gas can be mixed.

The mixer may form a venturi pipe in a direction extending from the air supply pipe, so that the high-pressure air flowing through the air supply pipe can be introduced in a state that the pressure of the air is lowered below the pressure of the gas.

The mixer may include: a flow path reducing part which has a cross-sectional area of the flow path that is reduced and into which air is introduced; a flow path maintaining part, disposed at a downstream side of the flow path reducing part, in which the gas flowing through the gas supply pipe is introduced, the flow path maintaining part having a cross-sectional area of the flow path maintained as the reduced cross-sectional area of the flow path of the flow path reducing part; and a flow path expansion part disposed at a downstream side of the flow path maintaining part, the flow path expansion part having a cross-sectional area of the flow path that is expanded, wherein the flow path maintaining part is formed to have a preset length or more in the flow direction of the air, so that an area to which gas is supplied can be secured to the preset length or more.

The length of the flow path maintaining part may be longer than the length of the flow path expansion part, so that the length of the flow path maintaining part is secured to the preset length or more. The length of the flow path maintaining part may be shorter than the length of the flow path reducing part, so that the air pressure can be gradually reduced.

The cross-sectional area at an inlet end of the flow path maintaining part may have a size of 0.5 to 0.6 times the cross-sectional area at an inlet end of the flow path reducing part, so that the pressure of the air supercharged through the supercharger flowing through the flow path maintaining unit can be lower than the pressure of the introduced gas.

The flow path maintaining part may have a plurality of supply holes through which the gas flowing through the gas supply pipe is introduced therein, so that the introduced gas may form a mixing flow in the flowing air.

The plurality of supply holes may be spaced apart from each other in a helical direction in the flow path maintaining part, so that the introduced gas may form a rotational flow. Therefore, the air and the gas can be mixed appropriately.

The mixer may include: a housing forming therein a flow path through which air flows, the housing having a venturi tube shape in which a flow path area of the flow path is decreased and then increased; and a gas supply unit disposed inside the housing and configured to supply the gas flowing through the gas supply pipe to the flow path, so that the gas can be mixed with the air flowing through the housing.

The housing may have a venturi tube shape and may include a first inner wall defining the flow path, and a first outer wall spaced apart from the first inner wall radially outwardly and having a cylindrical shape, wherein a space in which the gas supply unit is disposed is formed between the inner wall and the second outer wall.

The first inner wall may include: a flow path reducing part where a cross-sectional area of the flow path is reduced; a flow path maintaining part, disposed at a downstream side of the flow path reducing part, where the reduced cross-sectional area of the flow path is maintained; and a flow path expansion part, disposed at a downstream side of the flow path maintaining part, where the cross-sectional area of the flow path that is expanded, wherein the gas supply part is disposed on an outer periphery of the flow path maintaining part, so that the gas can be introduced into the flow path maintaining part through which the air having a lowered pressure flows.

The gas supply unit may include an inner housing disposed inside the housing and having an inner supply passage for supplying gas toward the flow path formed inside the housing, and a connection tube extending from one side of the inner housing to outside of the first outer wall of the housing to be connected to the gas supply unit, so that the gas flowing through the gas supply pipe can be introduced into the housing through the inner supply passage.

The inner housing may be spaced apart from the inlet end of the flow path maintaining part at a predetermined interval, so that gas can be supplied after the pressure of the inflow air is reduced.

The distance between the inner housing and the inlet end of the flow path maintaining part may be set to have a value of 0.2 to 0.3 times the length of the cross-section of the flow path of the flow path maintaining part to prevent the air in a depressurized state from flowing backward into the gas supply pipe.

The inner supply passage may be spirally formed inside the inner housing, so that a rotational flow can be generated by the inflowing gas.

The inner housing may include a second outer wall having a cylindrical shape, and a second inner wall spaced apart from the second outer wall radially inwardly and disposed in contact with the first inner wall, so that the inner housing is in close contact with the housing.

The second inner wall may have a plurality of inner holes formed to be spaced apart from each other along the inner supply passage, the gas flowing through the gas supply pipe being supplied through the plurality of inner holes to the flow path formed inside the housing, so that the gas flowing to the inner flow path of the housing can create a rotational flow in the air flow.

The first inner wall may have a plurality of supply holes formed at positions corresponding to positions of the plurality of inner holes.

The connecting tube may extend from one side of the second outer wall to outside of the first outer wall, and a gas passageway connecting the inner supply passage and the gas supply pipe is formed inside the connecting tube, so that the gas flowing through the gas supply pipe can be introduced into the housing through the inner gas passage.

The supercharger may be configured to drive a turbine using an exhaust gas discharged from the engine, so that the air supplied to the engine can be compressed by the gas exhausted from the engine.

The engine system may further include an exhaust gas recirculation pipe configured to supply a portion of the gas discharged from the engine to the engine, wherein the exhaust gas recirculation pipe is combined with the gas supply pipe and connected to the mixer, so that it is possible to recirculate a part of the exhausted gas. Even in this case, the exhaust gas and the gas supplied to the engine are not separately compressed.

The details of other embodiments are included in the detailed description and drawings.

DESCRIPTION OF EXEMPLARY EMBODIMENTS

Advantages and features of the present disclosure and methods of achieving them will become apparent with reference to embodiments described below in detail in conjunction with the accompanying drawings. However, the present disclosure is not limited to the embodiments disclosed below, but can be implemented in various different forms. The embodiments only fully disclose the present disclosure and are provided to allow those who have common knowledge in the art to which the present disclosure pertains to fully understand the scope of the present disclosure. The present disclosure is only defined by the scope of the claims. Like reference numerals refer to like elements throughout the specification.

Hereinafter, the present disclosure will be described with reference to the drawings for explaining an engine system according to embodiments of the present disclosure.

An engine system 1 of the present disclosure may be a configuration of a gas engine heat pump for driving an engine 10 by burning a mixture of air and gas, and driving a compressor (not shown) connected to the driven engine 10. In addition, the engine system 1 of the present disclosure may also be a configuration of a power generation system for driving a generator (not shown) with the driven engine 10.

Figure 1:
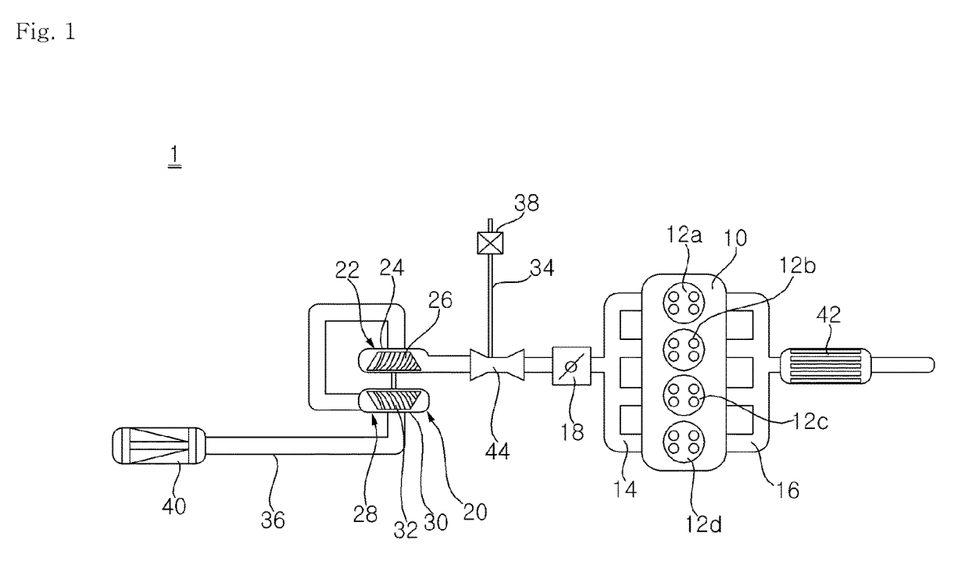
FIG. 1 is a schematic diagram of an engine system according to one embodiment of the present disclosure.

Referring to FIG. 1, an engine system 1 according to one embodiment of the present disclosure may includes: an engine 10 for driving a plurality of pistons by burning a mixture of air and gas; an air supply pipe 36 through which the air supplied to the engine 10 flows; a supercharger 20 for compressing the air flowing through the air supply pipe 36; a gas supply pipe 34 through which the gas supplied to the engine 10 flows; and a mixer 44 for mixing the air that has passed through the supercharger 20 and the gas.

The engine 10 may include a plurality of cylinders 12a, 12b, 12c and 12d, an intake manifold 14 for distributing a gaseous mixture which is supplied to each of the plurality of cylinders 12a, 12b, 12c and 12d, and an exhaust manifold 16 in which exhaust gas discharged from the cylinders 12a, 12b, 12c and 12d is collected.

A plurality of distribution passages may be formed in the intake manifold 14 to distribute the gaseous mixture which is supplied to the engine 10 to each of the plurality of cylinders, and a plurality of combining passages may be formed in the exhaust manifold 16, which are connected to each of the plurality of cylinders and joined to one exhaust passage.

The engine system 1 may further include a throttle valve 18 for controlling the amount of the gaseous mixture supplied to the engine 10. The throttle valve 18 may control the amount of the gaseous mixture supplied to the plurality of cylinders 12a, 12b, 12c and 12d.

The supercharger 20 compresses air which is supplied to the engine 10. Referring to FIG. 1, the supercharger 20 has two compression chambers disposed on the air supply pipe 36 through which air flows. The supercharger 20 may compress the flowing gaseous mixture, in at least one of the two compression chambers that are sequentially arranged, in one-stage compression or two-stage compression.

The supercharger 20 may include a first compression unit 22 for compressing the air flowing by the rotation of a first impeller 26, a second compression unit 28 for compressing the air that is introduced into the first compression unit 22 by the rotation of a second impeller 32, and a motor (not shown) for rotating at least one of the first impeller 26 and the second impeller 32. The motor may drive the two impellers with one motor through a clutch (not shown), or two motors may drive the two impellers respectively.

The first compression unit 22 may be disposed on the air supply pipe 36 connecting an air cleaner 40 to be described later and the mixer 44 to compress the flowing air. The first compression unit 22 is disposed at a downstream side of the second compression unit 28 in the air flow direction. The first compression unit 22 includes a first compression chamber 24 defining a space in which air is compressed, and the first impeller 26 disposed inside the first compression chamber 24 and rotated by a motor.

The second compression unit 28 is disposed on the flow path of the air flowing to the first compression unit 22, and compresses the flowing air. The second compression unit 28 includes a second compression chamber 30 defining a space in which the gaseous mixture is compressed, and the second impeller 32 disposed inside the second compression chamber 30 and rotated by a motor.

The air that has passed through the supercharger 20 may be compressed to a pressure of 1.3 bar or more.

The air supply pipe 36 connects the air cleaner 40 and the mixer 44. The supercharger 20 for compressing air is disposed on the air supply pipe 36. Since the supercharger 20 in the present disclosure is disposed on the air supply pipe 36, it compresses air only.

Gas flows through the gas supply pipe 34. The gas supply pipe 34 is connected to the mixer 44, so that gas may be introduced into the air flowing into the mixer 44.

The mixer 44 is connected to the air supply pipe 36. The gas supply pipe 34 is connected to the mixer 44 so that gas can be introduced into the air flowing through the mixer 44. The mixer 44 may have a venturi tube shape that allows the gas from the gas supply pipe 34 to flow in the air whose pressure was increased through the supercharger 20 and is then decreased. The specific structure and shape of the mixer 44 will be described in detail below.

Referring to FIG. 1, the engine system 1 of the present disclosure includes a zero governor 38 that adjusts the pressure of gas supplied to the mixer 44, and an air cleaner for filtering air supplied to the engine 10 to supply clean air, and an exhaust gas heat exchanger 42 for exchanging heat of exhaust gas discharged from the engine 10 with cooling water.

The zero governor 38 always supplies fuel at a constant pressure regardless of the pressure or flow rate change of the fuel flowing into the zero governor 38. The zero governor 38 can obtain a stable outlet pressure over a wide range, and can control the pressure of the gas fuel supplied to the engine to be almost constant in an atmospheric pressure of 1 bar to 1.05 bar.

The air cleaner may supply clean air to the air supply pipe 36 by filtering the air. The air cleaner 40 filters external air to block the introduction of moisture and oil in the form of dust and mist by using a filter.

The exhaust gas heat exchanger 42 may exchange heat of exhaust gas discharged from the engine 10 with cooling water. The cooling water that has passed through the exhaust gas heat exchanger 42 may flow back into the engine 10 to cool the engine 10.

Hereinafter, the mixer 44 according to one embodiment of the present disclosure will be described with reference to FIGS. 2 to 9.

Figure 2:
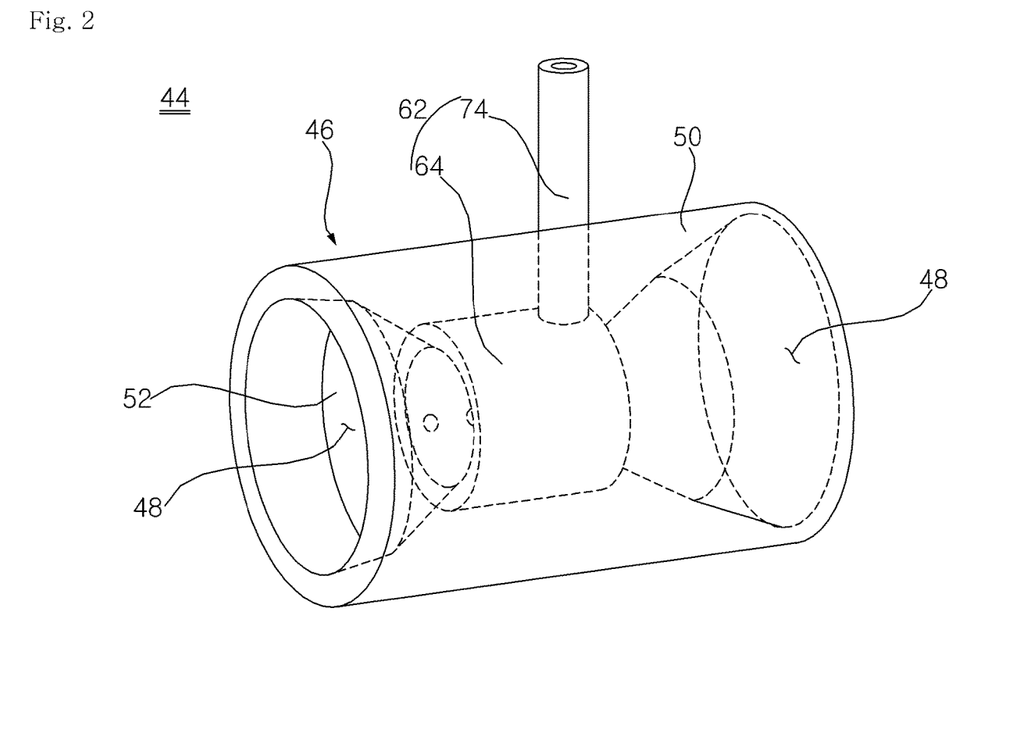
FIG. 2 is a perspective view of a mixer according to one embodiment of the present disclosure.
Figure 3:
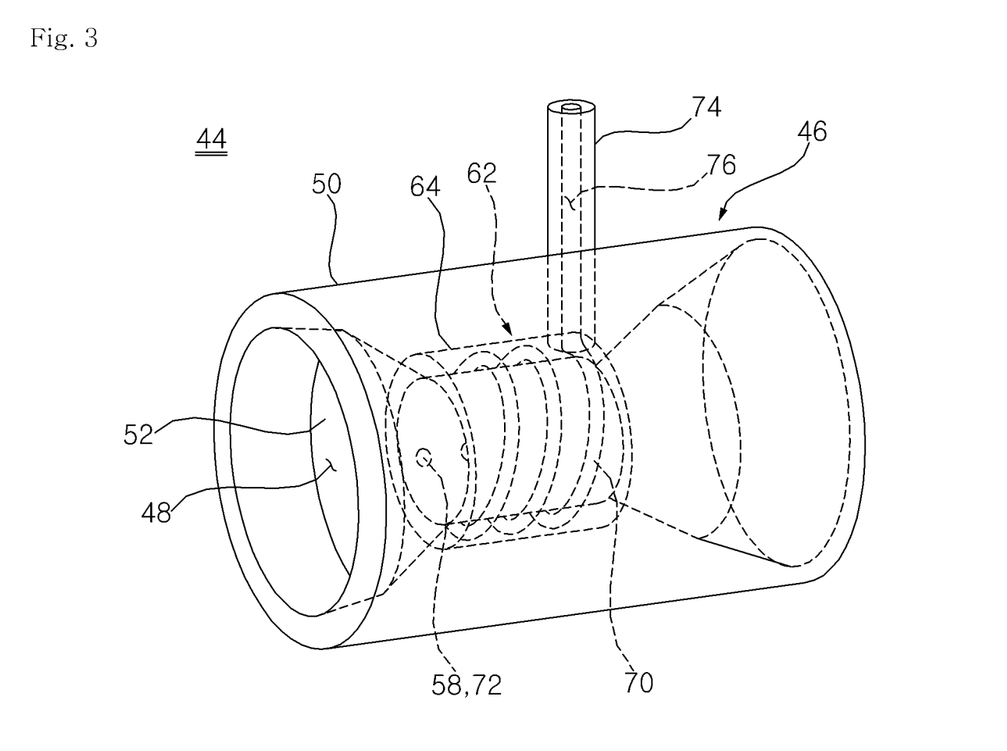
FIG. 3 is a perspective view of the mixer, which shows the inside of a gas supply unit according to one embodiment of the present disclosure.
Figure 4:
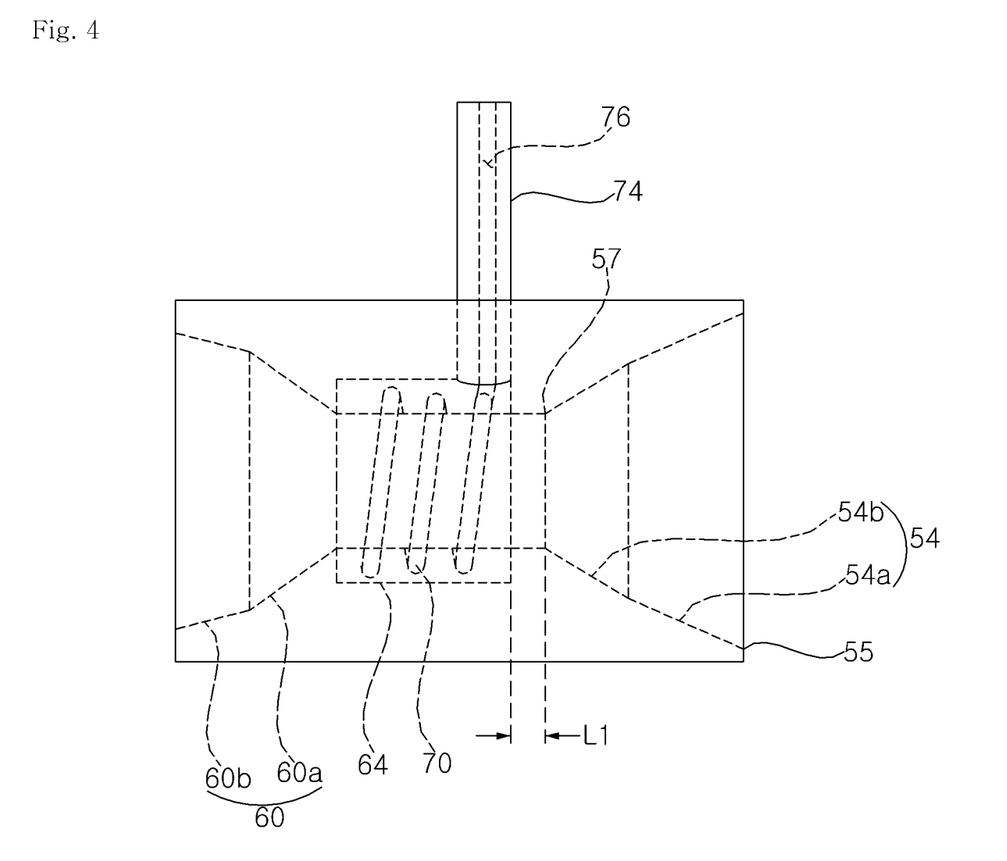
FIG. 4 is a side view of the mixer according to one embodiment of the present disclosure.

The mixer 44 is connected to the air supply pipe 36 in a direction extending from the air supply pipe 36 so that air flowing through the air supply pipe 36 passes through the venturi pipe. The gas supply pipe 34 is connected to the mixer 44 in a region where the cross-sectional area of the flow path in the mixer 44 is reduced.

The mixer 44 includes a housing 46 forming therein a flow path 48 through which air flows and has a venturi tube shape in which a flow path area of the flow path 48 is decreased and then increased, and a gas supply unit 62 disposed inside the housing 46, for supplying gas to a portion of the flow path 48 where the flow path area of the flow path 48 is reduced.

Figure 5:
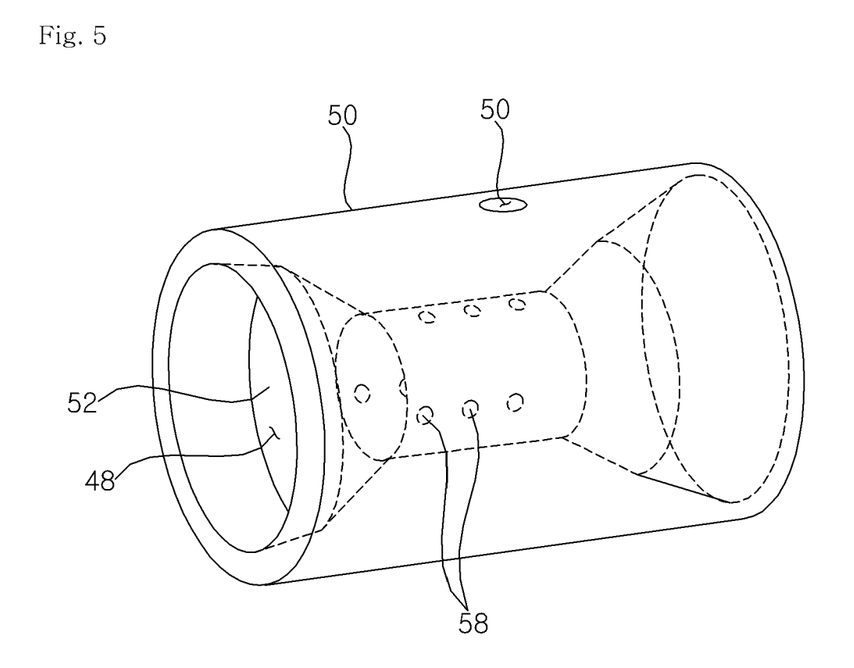
FIG. 5 is a perspective view of a housing according to one embodiment of the present disclosure.
Figure 6:
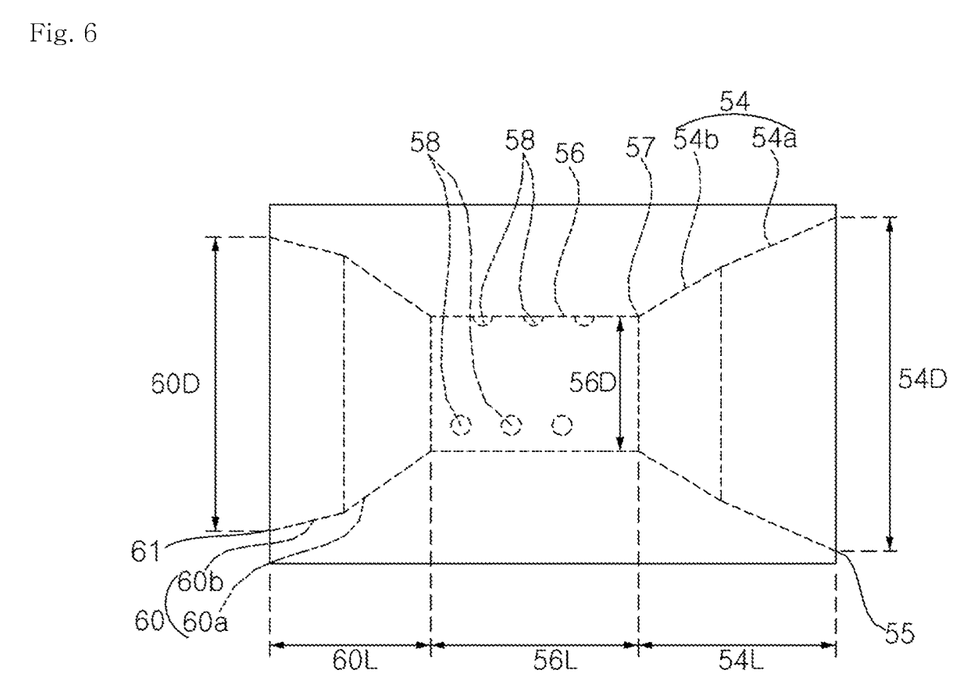
FIG. 6 is a side view of the housing according to one embodiment of the present disclosure.

The housing 46 has a venturi tube shape, and has a first inner wall 52 that defines a flow path 48, and a first outer wall 50 spaced apart from the first inner wall 52 radially outwardly and having a cylindrical shape. Between the first inner wall 52 and the first outer wall 50, a space in which the gas supply unit 62 is disposed is formed.

The first inner wall 52 includes a flow path reducing part 54 where a cross-sectional area of the flow path 48 is reduced, a flow path maintaining part 56, disposed at a downstream side of the flow path reducing part 54, where the reduced cross-sectional area of the flow path 48 is maintained, and a flow path expansion part 60, disposed at a downstream side of the flow path maintaining part 56, where the cross-sectional area of the flow path 48 that is expanded.

The flow path reducing part 54 is connected to the air supply pipe 36 so that air may be introduced therein. In the flow path reducing part 54, the cross-sectional area of the flow path 48 is reduced in the air flow direction, so that the pressure of the flowing air can be reduced.

The flow path reducing part 54 includes a first flow path reducing part 54a connected to the air supply pipe 36, and a second flow path reducing part 54b extending from a downstream end of the first flow path reducing part 54a to be connected to the flow path maintaining part 56. The reduction rate of a flow path cross-sectional area reduced in the first flow path reducing part 54a may be smaller than the reduction rate of a flow path cross-sectional area reduced in the second flow path reducing part 54b. The pressure of the air flowing through the second flow path reducing part 54b may be reduced faster than that of the air flowing through the first flow path reducing part 54a.

Referring to FIG. 6, a length 56D of the cross-sectional area at an inlet end 57 of the flow path maintaining part 56 may be 0.5 to 0.6 times a length 54D of the cross-sectional area at an inlet end of the flow path reducing part 54. The pressure of the air flowing through the flow path maintaining part 56 may be reduced to be atmospheric pressure or less. The pressure of the air flowing through the flow path maintaining part 56 becomes lower than the pressure of the gas flowing in the gas supply pipe 34 through the zero governor 38.

Accordingly, the pressure of the air flowing along the flow path reducing part 54 may be reduced to 0.9 bar from 1.3 bar or more.

Referring to FIG. 6, a length 60D of the cross-sectional area at a discharge end 61 of the flow path expansion part 60 may be 0.8 to 0.9 times a length of the cross-sectional area 54D at the inlet end of the flow path reducing part 54. Only compressed air flows in the flow path reducing part 54, but air and gas are mixed and flow in the flow path expansion part 60. That is, the amount of fluid flowing through the flow path expansion part 60 is greater than the amount of fluid flowing through the flow path reducing part 54. Therefore, when the length 60D of the cross-sectional area at the discharge end 61 of the flow path expansion part 60 and the length 54D of the cross-sectional area at the inlet end of the flow path reducing part 54 are same, the pressure at the discharge end 61 of the flow path expansion part 60 may be greater than the pressure at the inlet end 55 of the flow path reducing part 54. Accordingly, by setting the length 60D of the cross-sectional area at the discharge end 61 of the flow path expansion part 60 to be smaller than the length 54D of the cross-sectional area at the inlet end of the flow path reducing part 54, the pressure at the discharge end 61 of the flow path expansion part 60 may be similar to the pressure at the inlet end 55 of the flow path reducing part 54.

The flow path maintaining part 56 is formed to have a preset length or more in the air flow direction. A length 56L of the flow path maintaining part 56 in the air flow direction may be longer than a diameter 56D of the flow path section of the flow path maintaining part 56. Referring to FIG. 6, the length 56L of the flow path maintaining part 56 extending in the air flow direction ("length of the flow path maintaining part") is longer than the length 60L of the flow path expansion part 60 extending in the air flow direction ("length of the flow path expansion part") and shorter than the length 54L of the flow path reducing part 54 extending in the air flow direction ("length of the flow path reducing part").

The flow path maintaining part 56 may have a plurality of supply holes 58 through which gas is introduced therein. The plurality of supply holes 58 are arranged at regular intervals at positions of spirally formed inner gas flow passages, which will be described later. The plurality of supply holes 58 are formed at positions corresponding to a plurality of inner holes 72 formed in the gas supply unit 62 to be described later.

The supply holes 58 according to the present embodiment may be formed while maintaining an interval of 120 degrees in the circumferential direction of the first inner wall 52. Since the plurality of supply holes 58 are formed at the position of the spiral inner supply passage 70, the plurality of supply holes 58 may be spaced apart from each other in the air flow direction in the same phase.

In the flow path maintaining part 56, the flowing air and the gas introduced through the plurality of supply holes 58 may be mixed to form a gaseous mixture. Since the plurality of supply holes 58 are formed along the spiral direction, the gas introduced through the plurality of supply holes 58 forms a rotational flow in the flowing air, thereby facilitating the mixing of the air and the gas.

In the flow path expansion part 60, a mixture of air and gas flows. In the flow path expansion part 60, the cross-sectional area of the flow path increases gradually. Since the cross-sectional area of the flow path in the flow path expansion part 60 increases, the pressure of the gaseous mixture flowing through the flow path expansion part 60 is gradually increased in the flow direction.

The size of the flow path cross-sectional area at the discharge end of the flow path expansion part 60 may be 0.9 to 1 times the size of the flow path cross-sectional area at the inlet end of the flow path reducing part 54.

The flow path expansion part 60 includes a first flow path expansion part 60a extending from the flow path maintaining part 56 and a second flow path expansion part 60b extending from a downstream end of the first flow path expansion part 60a. The expansion rate of the flow path cross-sectional area expanded in the first flow passage expansion part 60a is greater than the expansion rate of the flow path cross-sectional area expanded in the second flow passage expansion part 60b. The pressure increase rate of the air flowing through the first flow path extension part 60a may be greater than the pressure increase rate of the air flowing through the second flow path extension part 60b. The pressure of the air flowing through the first flow path expansion part 60a may be increased faster than that of the air flowing through the second flow path expansion part 60b.

Figure 7:
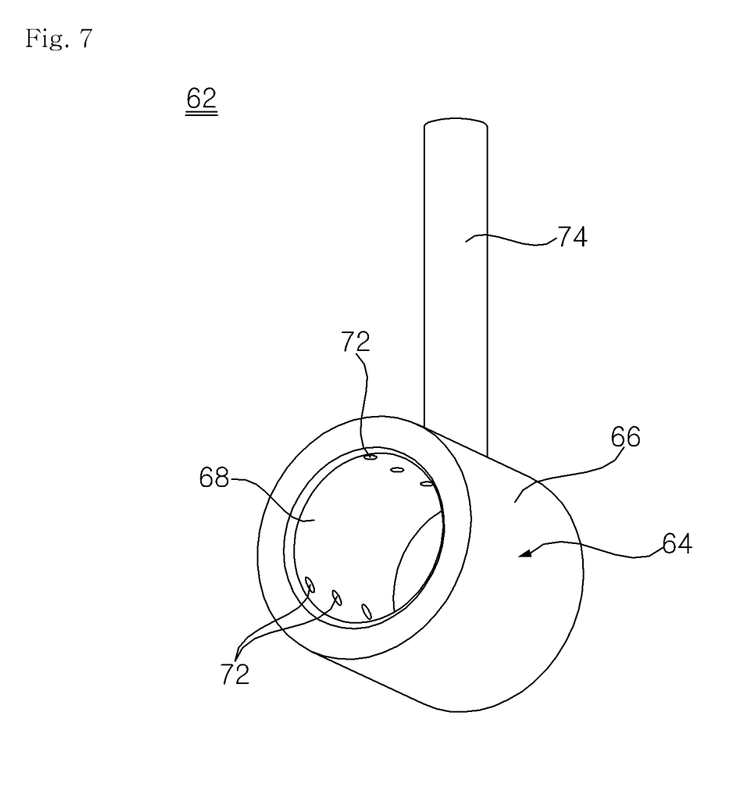
FIG. 7 is a perspective view of the gas supply unit according to one embodiment of the present disclosure.

The gas supply unit 62 is disposed inside the housing 46. The gas supply unit 62 is disposed between the first inner wall 52 and the first outer wall 50 of the housing 46. The gas supply unit 62 is disposed inside the housing 46 and supplies gas to the flow path 48 formed inside the housing 46.

The gas supply unit 62 is disposed inside the housing 46, and includes an inner housing 64 having an inner supply passage 70 for supplying gas toward the flow path formed inside the housing 46 and a connection tube 74 extending from one side of the inner housing 64 to the outside of the first outer wall 50 of the housing 46.

The inner housing 64 is disposed on the outer periphery of the flow path maintaining part 56 inside the housing 46. Referring to FIG. 4, the inner housing 64 may be spaced apart from the inlet end 57 of the flow path maintaining part 56 by a predetermined distance. In this way, it is possible to prevent the gas supplied from the inner housing 64 from flowing backward due to the pressure generated in the flow direction of the air flowing into the flow path maintaining part 56. A distance L1 between the inner housing 64 and the inlet end 57 of the flow path maintaining part 56 may be 0.2 to 0.3 times the length 56D of the flow path cross-section of the flow path maintaining part 56.

The inner housing 64 is spaced apart from the inlet end 57 of the flow path maintaining part 56 by a predetermined distance, so that the gas supplied to the gas supply unit 62 can be stably supplied. In addition, since the inner housing 64 is spaced apart from the inlet end 57 of the flow path maintaining part 56 by the predetermined distance, the pressure increase due to the gas supply can be alleviated. Accordingly, the gas may be easily introduced into the flow path formed inside the housing 46.

Referring to FIG. 7, the inner housing 64 may have a cylindrical shape. The inner housing 64 may have an inner supply passage 70 that is spirally formed therein. The inner housing 64 includes a second outer wall 66 having a cylindrical shape, and a second inner wall 68 spaced apart from the second outer wall 66 radially inwardly and disposed in contact with the first side wall 52.

Figure 8:
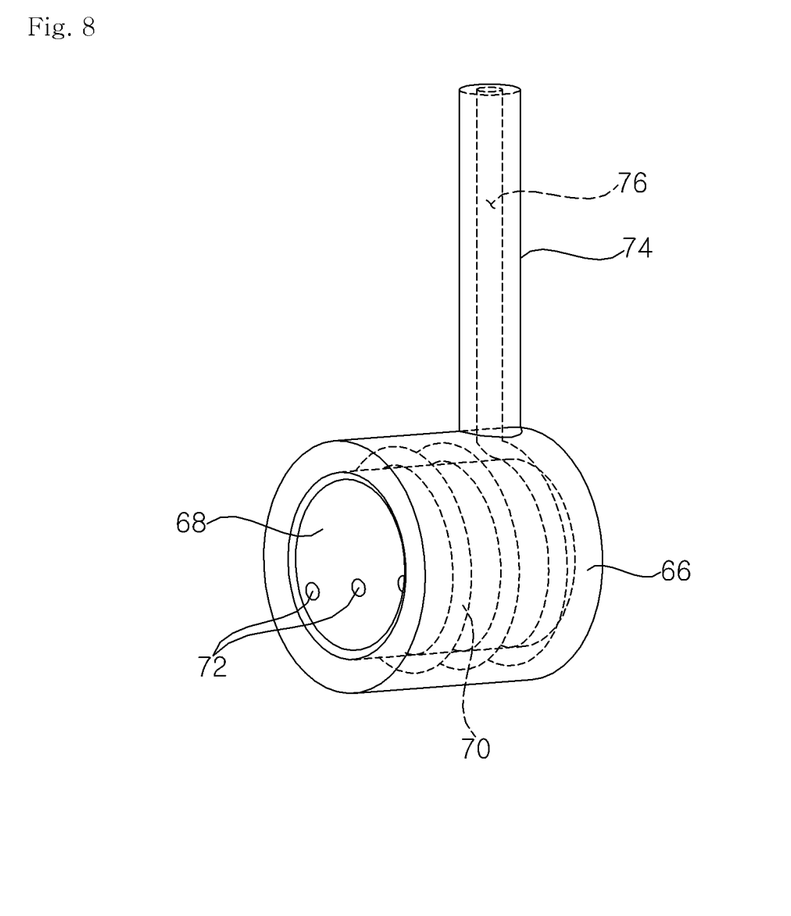
FIG. 8 is a perspective view of the gas supply unit, which shows an inner supply passage according to one embodiment of the present disclosure.

The spiral inner supply passage 70 is formed between the second inner wall 68 and the second outer wall 66. The second inner wall 68 is disposed in contact with the outer circumference of the first inner wall 52 of the housing 46. A plurality of inner holes 72 are formed in the second inner wall 68. The plurality of inner holes 72 are spaced apart from each other along the inner supply passage 70 formed in the inner housing 64. The plurality of inner holes 72 are disposed at positions corresponding to the plurality of supply holes 58.

Figure 9:
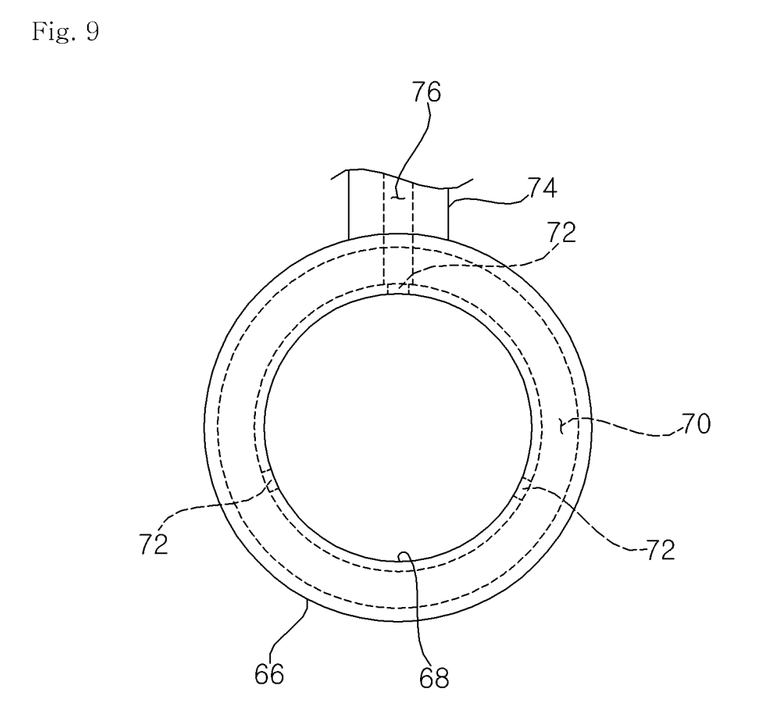
FIG. 9 is a front view of the gas supply unit according to one embodiment of the present disclosure.

Referring to FIG. 9, the plurality of inner holes 72 may be formed to be spaced apart from each other with a phase difference of 120 degrees along the inner supply passage 70. However, the plurality of inner holes 72 may be disposed at different positions within a phase difference range of 90 degrees to 130 degrees.

The gas flowing along the inner supply passage 70 may be supplied to the flow path 48 formed inside the housing 46 through the inner holes 72 and the supply holes 58. The pressure of the gas flowing through the inner supply passage 70 is 1 bar to 1.05 bar, which is higher than 0.9 bar, which is the pressure of the air flowing through the flow path maintaining part 56, so that the gas flowing through the inner supply passage 70 can be sucked into the flow path 48 formed inside the housing 46.

The connecting tube 74 is connected to one side of the second outer wall 66. A gas passageway 76 through which gas flows is formed inside the connection tube 74. The gas passageway 76 formed inside the connection tube 74 is connected to the inner supply passage 70 formed inside the inner housing 64. The connection tube 74 may extend to the outside of the first outer wall 50 of the housing 46 to be connected to the gas supply pipe 34.

Figure 10:
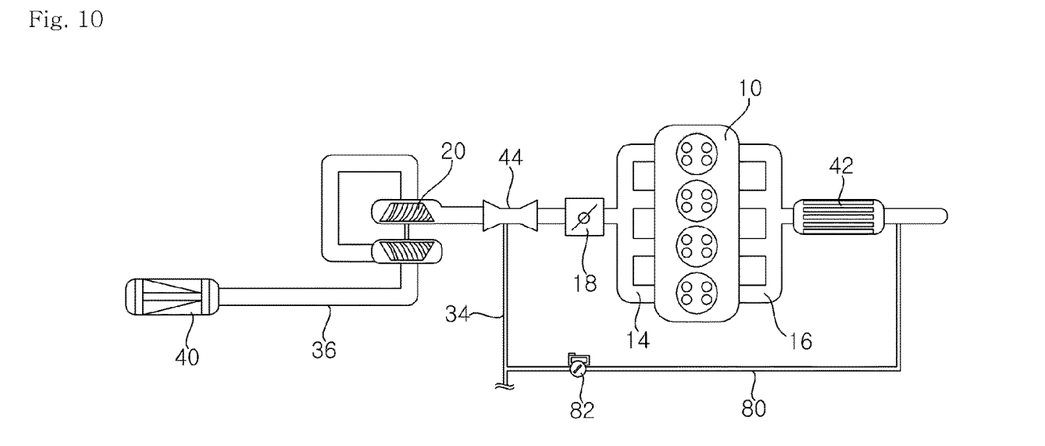
FIG. 10 is a schematic diagram of an engine system according to another embodiment of the present disclosure.

Referring to FIG. 10, an engine system 1' according to another embodiment may further include an exhaust gas recirculation pipe 80 which supplies a part of exhaust gas discharged from the engine 10 to the mixer 44, thereby minimizing the discharge of harmful components in the exhaust gas discharged from the engine 10.

A circulation valve 82 for controlling the flow of exhaust gas discharged from the engine 10 may be disposed in the exhaust gas recirculation pipe 80. The exhaust gas recirculation pipe 80 is connected to the gas supply pipe 34. The gas supply pipe 34 connected to the exhaust gas recirculation pipe 80 is connected to the mixer 44.

Figure 11:
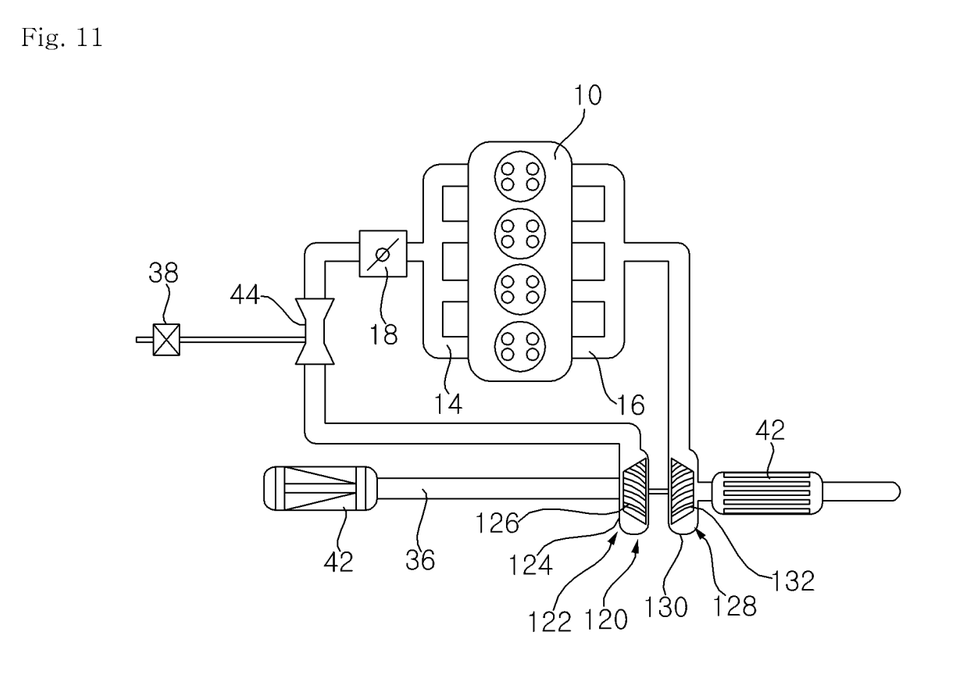
FIG. 11 is a schematic diagram of an engine system according to still another embodiment of the present disclosure.

Referring to FIG. 11, an engine system 1" according to still another embodiment is shown. In the engine system 1", the supercharger 120 compressing air supplied to the engine 10 may be operated by a turbine 128 driven by exhaust gas discharged from the engine 10.

The supercharger 120 turns a turbine blade 132 disposed inside a turbine chamber 130 using exhaust gas discharged from the engine 10. With the rotation of the turbine blade 132, a compressor 122 connected to the turbine blade 132 through a rotary shaft may be driven to compress the air supplied to the engine 10. The compressor 122 may include a compression chamber 124 and a compression blade 126 that is rotatably disposed inside the compression chamber 124 and compresses air supplied to the engine 10. The compression blade 126 is connected to the turbine blade 132 through the rotating shaft.

Accordingly, the turbine 128 may be driven by the gas exhausted during the driving of the engine 10 to compress air supplied to the engine 10.

Figure 12:
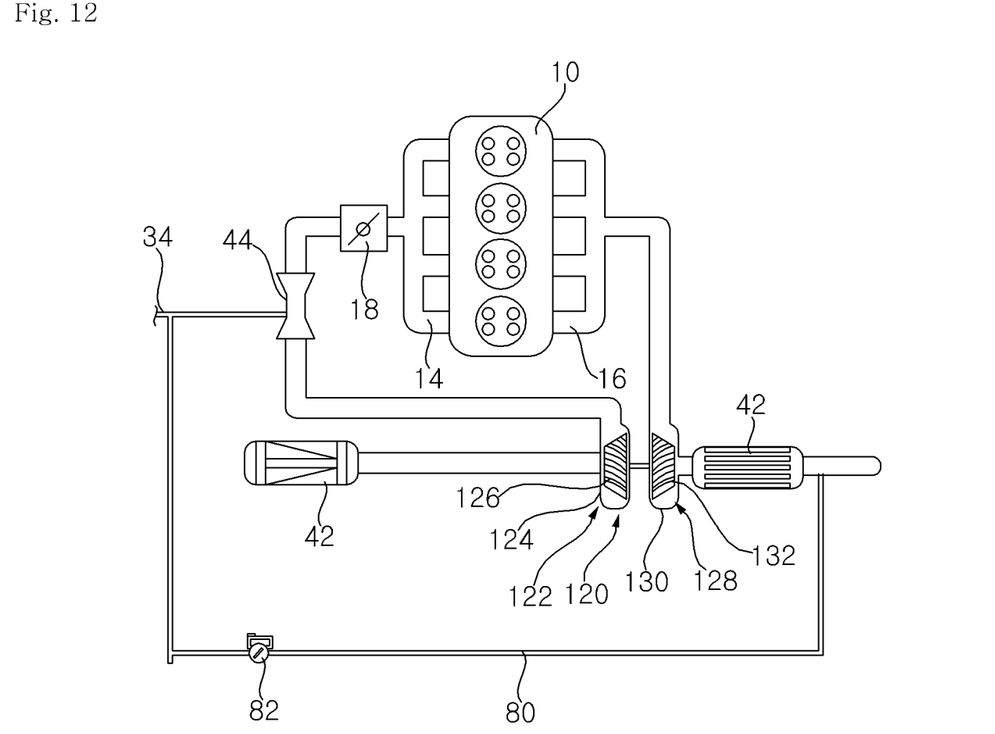
FIG. 12 is a schematic diagram of an engine system according to further still another embodiment of the present disclosure.

Referring to FIG. 12, an engine system 1''' according to further still another embodiment may further include an exhaust gas recirculation pipe 80 that supplies a part of the exhaust gas discharged from the engine 10 in the engine system 1" of FIG. 11 to the mixer 44 to minimize the discharge of harmful components in the exhaust gas discharged from the engine 10.

A circulation valve 82 for controlling the flow of exhaust gas discharged from the engine 10 may be disposed in the exhaust gas recirculation pipe 80. The exhaust gas recirculation pipe 80 is connected to the gas supply pipe 34. The gas supply pipe 34 connected to the exhaust gas recirculation pipe 80 is connected to the mixer 44.

According to the engine system of the present disclosure, there are one or more of the following effects.

First, the engine system of the present disclosure has a structure in which only air is first compressed and gas is then mixed with the compressed air and supplied to the engine. Accordingly, the gas supplied to the engine is not compressed, so that the safety of the engine system can be secured.

Second, high-pressure air passes through the venturi tube, and gas is introduced in a state where the pressure of the air is lowered, which allows the gas to be mixed with the high-pressure air and supplied to the engine. Accordingly, the performance of the engine can be improved.

Third, since the gas flowing into the air flow path is supplied through the holes arranged along the spiral supply passage, the air and the gas are supplied to the engine in a properly mixed state, so that the performance of the engine can be secured above a certain level.

Effects of the present disclosure are not limited to the effects mentioned above, and other effects not mentioned will be clearly understood by those skilled in the art from the description of the claims.

In the above, preferred embodiments of the present disclosure have been illustrated and described, but the present disclosure is not limited to the specific embodiments described above. Various modifications may be made by those of ordinary skill in the art to which the present disclosure pertains without departing from the gist of the present disclosure as claimed in the claims, and these modifications should not be individually understood from the technical spirit or perspective of the present disclosure.

What is claimed is:

1. An engine system, comprising:
an engine configured to drive a plurality of pistons by burning a mixture of air and gas;
an air supply pipe through which the air supplied to the engine flows;
a supercharger configured to compress the air flowing through the air supply pipe;
a gas supply pipe through which the gas supplied to the engine flows; and
a mixer configured to mix the air that has passed through the supercharger and the gas, wherein the mixer has a venturi tube shape in which a cross-sectional area of a flow path decreases and expands in a flow direction of the air that has passed through the supercharger, and the gas supply pipe is connected to a portion of the mixer where the cross-sectional area of the flow path in the mixer is decreased, wherein the mixer includes:
- a housing forming therein the flow path through which air flows, the housing having the venturi tube shape in which the flow path area of the flow path is decreased and then increased; and
- a gas supply unit disposed inside of the housing and configured to supply the gas flowing through the gas supply pipe to the flow path, wherein the gas supply unit includes:
  - an inner housing disposed inside of the housing and having an inner supply passage for supplying gas toward the flow path formed inside of the housing; and
  - a connection tube that extends from one side of the inner housing to outside of a first outer wall of the housing to be connected to the gas supply unit, and wherein the inner supply passage is spirally formed inside of the inner housing.

2. The engine system of claim 1, wherein the mixer forms a venturi pipe in a direction extending from the air supply pipe.

3. The engine system of claim 1, wherein the mixer includes:
- a flow path reducing part, into which air is introduced, where the cross-sectional area of the flow path is reduced;
- a flow path maintaining part, disposed at a downstream side of the flow path reducing part, where the reduced cross-sectional area of the flow path is maintained, the gas flowing through the gas supply pipe being introduced into the flow path maintaining part; and
- a flow path expansion part, disposed at a downstream side of the flow path maintaining part, where the cross-sectional area of the flow path is expanded, and wherein the flow path maintaining part is formed to have a preset length in the flow direction of the air.

4. The engine system of claim 3, wherein the flow path maintaining part has a length longer than a length of the flow path expansion part and shorter than a length of the flow path reducing part.

5. The engine system of claim 3, wherein a cross-sectional area at an inlet end of the flow path maintaining part has a size of 0.5 to 0.6 times a cross-sectional area at an inlet end of the flow path reducing part.

6. The engine system of claim 3, wherein the flow path maintaining part has a plurality of supply holes through which the gas flowing through the gas supply pipe is introduced therein.

7. The engine system of claim 6, wherein the plurality of supply holes is spaced apart from each other in a helical direction in the flow path maintaining part.

8. The engine system of claim 1, wherein the housing, having the venturi tube shape, includes the first inner wall defining the flow path, and a first outer wall spaced apart from the first inner wall radially outwardly and having a cylindrical shape, and wherein a space in which the gas supply unit is disposed is formed between the first inner wall and the first outer wall.

9. The engine system of claim 8, wherein the first inner wall include:
- a flow path reducing part where a cross-sectional area of the flow path is reduced;
- a flow path maintaining part, disposed at a downstream side of the flow path reducing part, where the reduced cross-sectional area of the flow path is maintained; and
- a flow path expansion part, disposed at a downstream side of the flow path maintaining part, where the cross-sectional area of the flow path that is expanded, and wherein the gas supply part is disposed on an outer periphery of the flow path maintaining part.

10. The engine system of claim 9, wherein the inner housing is spaced apart from the an inlet end of the flow path maintaining part by a predetermined distance.

11. The engine system of claim 9, wherein a distance between the inner housing and an inlet end of the flow path maintaining part is set to have a value of 0.2 to 0.3 times a length of a cross-sectional area of the flow path of the flow path maintaining part.

12. The engine system of claim 8, wherein the inner housing includes a second outer wall having a cylindrical shape, and a second inner wall spaced apart from the second outer wall radially inwardly and disposed in contact with the first inner wall.

13. The engine system of claim 12, wherein the second inner wall has a plurality of inner holes spaced apart from each other along the inner supply passage, the gas flowing through the gas supply pipe being supplied through the plurality of inner holes to the flow path formed inside of the housing.

14. The engine system of claim 13, wherein the first inner wall has a plurality of supply holes formed at positions corresponding to positions of the plurality of inner holes.

15. The engine system of claim 12, wherein the connection tube extends from one side of the second outer wall to outside of the first outer wall, and a gas passageway that connects the inner supply passage and the gas supply pipe is formed inside of the connecting tube.

16. The engine system of claim 1, wherein the supercharger is configured to drive a turbine using an exhaust gas discharged from the engine to compress the flowing air.

17. The engine system of claim 1, further comprising:
- an exhaust gas recirculation pipe configured to supply a portion of the gas discharged from the engine to the engine, wherein the exhaust gas recirculation pipe is connected to the gas supply pipe and connected to the mixer.

* * * * *